United States Patent [19]
Futral et al.

[11] Patent Number: 6,044,415
[45] Date of Patent: Mar. 28, 2000

[54] SYSTEM FOR TRANSFERRING I/O DATA BETWEEN AN I/O DEVICE AND AN APPLICATION PROGRAM'S MEMORY IN ACCORDANCE WITH A REQUEST DIRECTLY OVER A VIRTUAL CONNECTION

[75] Inventors: William T. Futral; Greg J. Regnier, both of Portland; Stanley S. Amway, III, Hillsboro, all of Oreg.

[73] Assignee: Intel Corporation, Santa Clara, Calif.

[21] Appl. No.: 09/032,599

[22] Filed: Feb. 27, 1998

[51] Int. Cl.[7] .............................. G06F 13/14; G06F 15/17
[52] U.S. Cl. .................................. 710/33; 710/4; 710/37; 709/229; 709/301; 709/302; 370/397; 370/399
[58] Field of Search .......................... 711/203; 709/301, 709/302, 229; 710/3, 4, 33, 37; 370/397, 399

[56] References Cited

U.S. PATENT DOCUMENTS

| | | | |
|---|---|---|---|
| 5,446,915 | 8/1995 | Pierce ........................................ | 712/11 |
| 5,758,182 | 5/1998 | Rosenthal et al. ......................... | 710/3 |
| 5,790,804 | 8/1998 | Osborne .................................... | 709/245 |
| 5,915,124 | 6/1999 | Morris, III ............................... | 711/146 |

OTHER PUBLICATIONS

"Virtual Interface Architecture Specification", Version 1.0, Dec. 16, 1997, Compaq Computer Corp., Intel Corp., Mircosoft Corp., pp. 1–83.

"Intelligent I/O ($I_2O$) Architecture Specification", Version 1.5, Mar. 1997, $I_2O$ Special Interest Group, pp. 1–1 through 2–23.

*Primary Examiner*—Thomas C. Lee
*Assistant Examiner*—Ilwoo Park
*Attorney, Agent, or Firm*—Steven P. Skabrat

[57] ABSTRACT

A virtual connection created between an application program and a selected I/O device is used as a communications medium for controlling I/O processing of the I/O device by the application program. The virtual connection is implemented as a system area network connecting a process of the application program and the I/O device. The application program registers the application program's memory that the application program shares with the I/O device (i.e., gives access rights to the I/O device) with the system area network. Once the virtual connection is created and initialized, the application program uses the virtual connection to send request messages for I/O services to the I/O device and to receive reply messages from the I/O device. The I/O device uses the virtual connection to obtain source data from the application program's memory for I/O write operations and to transfer data to the application program's memory for I/O read operations.

16 Claims, 7 Drawing Sheets

SYSTEM FOR TRANSFERRING I/O DATA BETWEEN AN I/O DEVICE AND AN APPLICATION PROGRAM'S MEMORY IN ACCORDANCE WITH A REQUEST DIRECTLY OVER A VIRTUAL CONNECTION

BACKGROUND OF THE INVENTION

1. Field of the Invention

The present invention relates generally to computer systems and more specifically to the control of system input/output processing by an application program.

2. Description of Related Art

A computer system typically includes one or more peripheral input/output (I/O) devices such as keyboards, printers, storage devices, and monitors, in addition to the central processing unit (CPU) and main memory. When an application program being executed by the CPU needs to interact with the I/O devices to receive input data or to send output data, the application program ordinarily requests operating system software to coordinate and control the I/O operation. Hence, the computer programmer developing the application program is shielded from the complexities of I/O processing for the various I/O devices of the computer system because the operating system software handles the low-level details. In addition, the operating system maintains a high level of security and protection of system memory during processing of I/O requests.

However, this approach often has a negative effect on system performance. When the operating system controls all I/O processing for the application program, several additional layers of software are executed for each I/O operation, which results in performance bottlenecks for many combinations of application programs, operating systems and I/O devices. FIG. 1 is a prior art diagram illustrating the multiple layers of software required for an application program to communicate with an I/O device. For example, an application program 10 needs to write data to or read data from I/O device 12. The application program calls operating system (OS) 14 procedures in file system software 16 to request the I/O operations. File system software 16 interacts with OS kernel 18 and I/O device driver software 20 to initiate and manage the I/O operation. In this architecture, context switches between multiple OS and application processes are required in order to effect the I/O transfer. When fast I/O performance is critical to the application program, the overhead resulting from the context switches and the inter-process transfer of data is problematic. When the prior art model is expanded for a clustered environment of multiple servers accessing many I/O platforms controlling I/O devices, the problem is made worse because of the additional inter-platform communication overhead. Overcoming these performance bottlenecks to improve system performance without imposing complex and burdensome requirements on the application program is desired.

SUMMARY OF THE INVENTION

An embodiment of the present invention is a method of controlling I/O operations of an I/O device by an application program. The method includes the steps of creating a virtual connection within a system area network between the application program and the I/O device, the application program and the I/O device being coupled to the system area network; registering the application program's memory with the system area network; sending a request message for I/O service directly from the application program to the I/O device over the virtual connection, the request message including a virtual address of the application program's memory; and transferring I/O data between the I/O device and the application program's memory specified by the virtual address over the virtual connection.

BRIEF DESCRIPTION OF THE DRAWINGS

The features and advantages of the present invention will become apparent from the following detailed description of the present invention in which.

DETAILED DESCRIPTION OF THE INVENTION

Figure 1:
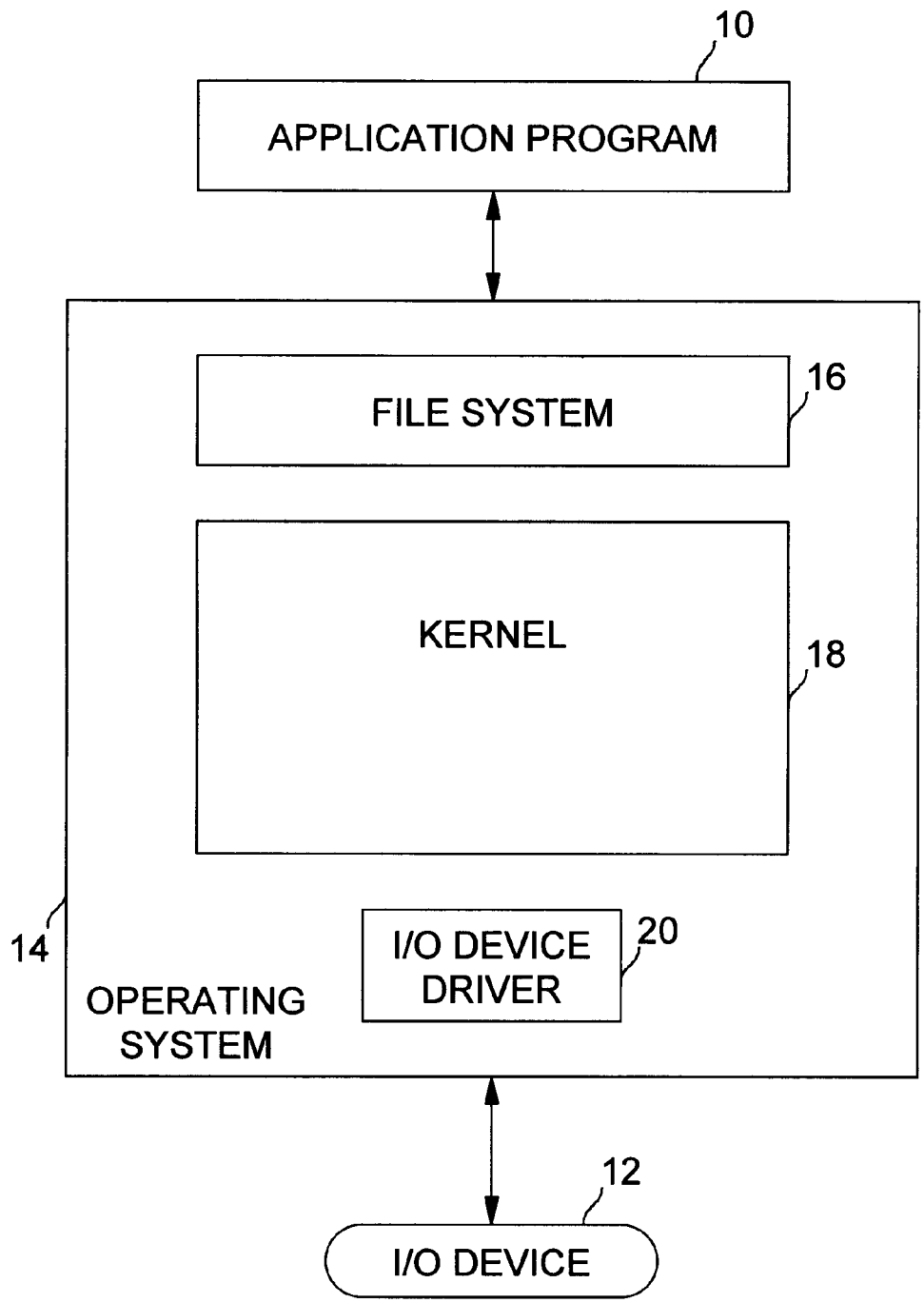
FIG. 1 is a prior art diagram illustrating the multiple layers of software required for an application program to communicate with an I/O device.

The present invention allows an application program to take direct control of I/O devices without compromising the security or memory protection of the computer system. The present invention combines the security and protection afforded by virtual interface (VI) architecture design with the structured process of Intelligent I/O (I2O) services to allow application programs running on the OS to directly control I/O devices without compromising security or protection, and without the need for the OS to inspect, authenticate, and authorize each individual I/O transaction request. The VI architecture is defined in the Virtual Interface Architecture Specification, Version 1.0, published Dec. 16, 1997, and incorporated herein by reference. The OS uses the facilities provided by the VI architecture coupled with I2O-specific extensions to allow an application program to send control messages directly to an I/O device. The nature of the VI architecture permits the use of secure data transfer channels between the application program and the I/O device as well as the protection against the application program inappropriately accessing protected regions of system memory.

The VI architecture defines a hardware/software interface for high-performance, scaleable communication components that link collections of computers into functional units called clusters. A virtual interface (VI) is a communications interface between a network interface controller (NIC) and a process allowing a NIC direct access to the process's memory. A VI consists of a pair of work queues, one for send operations and the other for receive operations, that store a packet descriptor between the time it is posted and the time a completion operation indicates that the NIC has completed processing of the packet descriptor. A pair of VIs are associated using a connect operation to allow packets sent at one VI to be received at the other. A packet descriptor is organized as a list of segments specifying a data movement operation and associated parameters.

An objective of the VI architecture is to minimize the software overhead incurred to perform communication between processes within a cluster. A cluster is a collection of processing units interconnected by a single logical fabric that collectively function as a single computer system. The VI architecture is a strategy for inter-node message passing that enables processes to directly access a network interface controller, thereby reducing overhead, so that application programs better utilize a fast interconnect fabric. The fast interconnect fabric is a collection of hardware elements, such as routers, switches, connectors, and cables, that interconnect a set of processing nodes in a system area network (SAN). A SAN is comprised of one or more interconnect fabrics, to which are attached host systems and I/O units controlling I/O devices.

The I2O architecture is a result of the computer industry demand for I/O device driver portability between OS and host platforms, combined with increasing demands for intelligent, distributed I/O processing. The I2O architecture is defined by the I2O special interest group (SIG) in the "I2O Architecture Specification", Version 1.5, March 1997, incorporated herein by reference. The basic objective of I2O is to provide an I/O device driver architecture that is independent of both the specific I/O device being controlled and the host OS. This is achieved by logically separating the portion of the driver that is responsible for managing the I/O device from the specific implementation details for the OS that it serves. By doing so, the part of the driver that manages the I/O device becomes portable across multiple operating systems. I2O also acts to hide the nature of the communication between various mechanisms, and in doing so provides processor and bus technology independence.

The I2O system is also designed to facilitate intelligent I/O subsystems, with support for message passing between multiple independent processors. By relieving the host processor of interrupt-intensive I/O tasks required by the various layers of I/O device driver architecture, the I2O system improves I/O performance. I2O-compatible systems efficiently deliver the I/O throughput required by a wide range of high bandwidth applications. At the same time, I2O imposes no restrictions as to where the layered I/O software modules execute, providing support for single processor, multiprocessor, and clustered systems.

Figure 2:
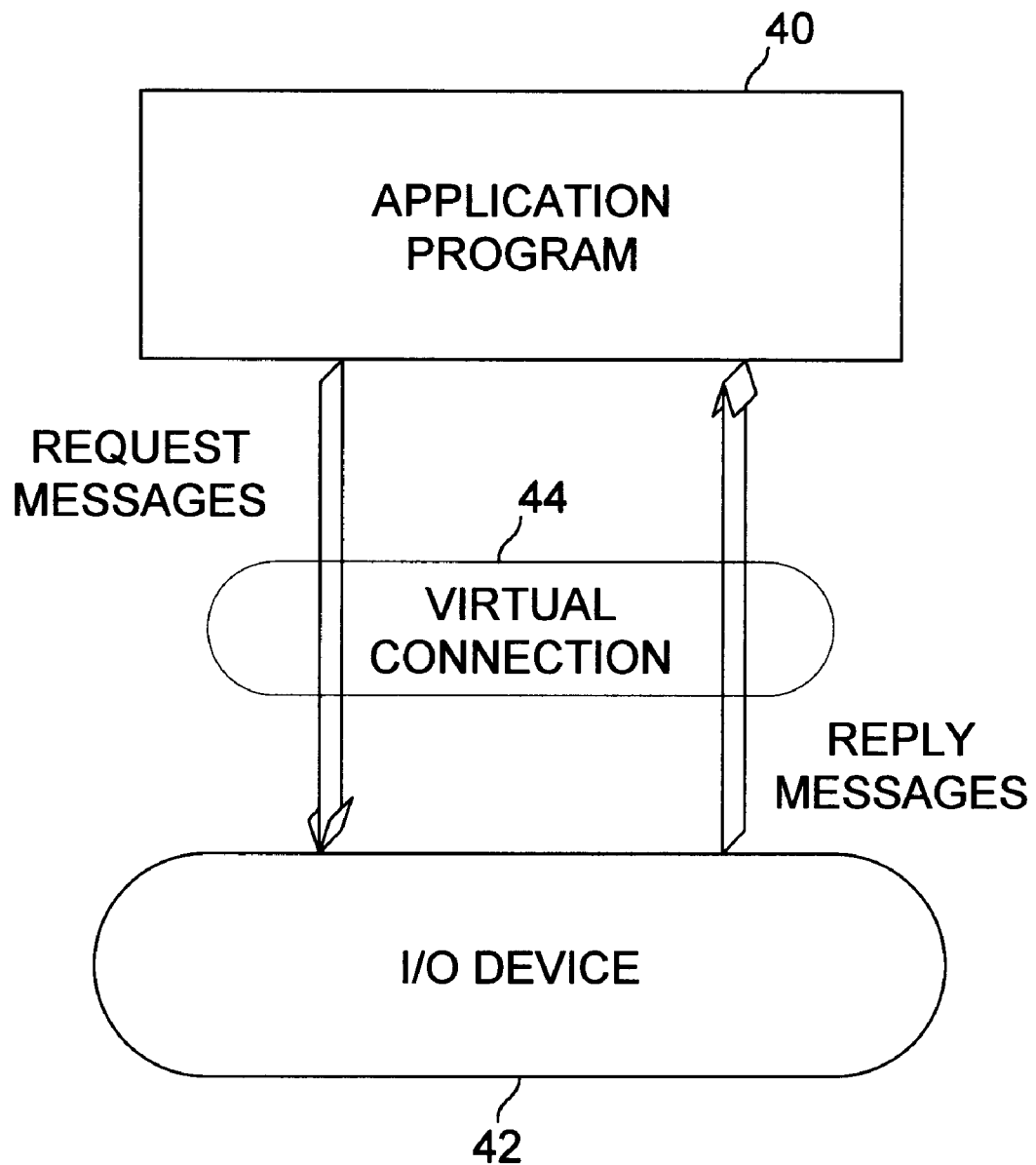
FIG. 2 is a diagram illustrating a virtual connection between an application program and an I/O device according to the present invention.

Using the VI architecture, an embodiment of the present invention creates a virtual connection between the application program and a selected I/O device and provides registration of the application program's memory that the application program shares with the I/O device (i.e., gives access rights to the I/O device). Once the virtual connection is created and initialized, the application program uses the virtual connection to send I2O request messages and to receive I2O reply messages. The I/O device uses the virtual connection to pull source data from the application program's memory for output operations and to ship data to the application program's memory for input operations. FIG. 2 is a diagram illustrating a virtual connection between an application program and an I/O device according to the present invention. Application program 40 sends I2O request messages to I/O device 42 over virtual connection 44. I/O device 42 sends reply messages back to the application program 40 over the virtual connection.

The operation of the virtual connection requires that the application program supplies not only a virtual address of data buffers in the application program's memory space used for the I/O operations, but also a memory handle for accessing the memory storing the data buffers. The memory handle assures that the process that registered the memory is the same as the process executing the data transfer. Using this information, the I/O device communicates with the particular application program via the virtual connection. The VI architecture protects all memory that is not specifically registered, and also protects memory registered by other application programs. This allows an I/O device to perform I/O on behalf of the application program and still protects all other application programs from corruption resulting from improper I/O operations (e.g., an application program specifying the wrong memory address for writing of data).

An embodiment of the present invention provides enhancements to the VI architecture interface that allows the application program to take direct control of I/O devices through the I2O system. The combination of I2O and a system area network (SAN) implementation gives sufficient protection for the application program to issue I/O requests directly to the I/O device. A new layer in the VI architecture allows a user process such as an application program to send and receive messages on the SAN without going through the OS, but also provides protection so that messages can only be sent to where the OS has authorized a virtual connection. A generic message passing interface is provided to allow the application program a direct connection to the appropriate I/O device drivers. The OS still has the authority to authorize the virtual connection, but once authorized, the application program sends messages directly to the I/O device driver.

Figure 3:
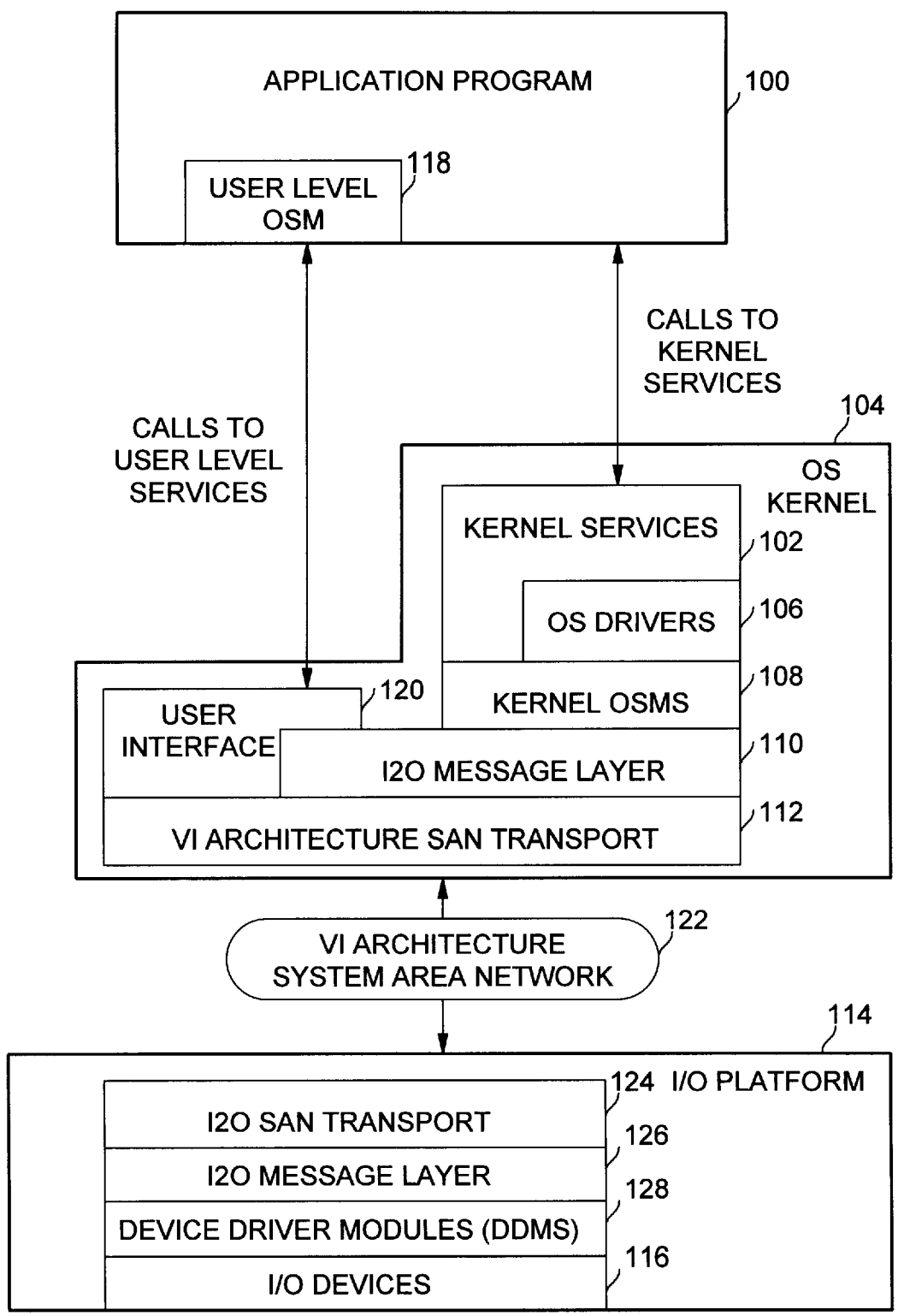
FIG. 3 is a diagram illustrating an application program controlling an I/O device.

FIG. 3 illustrates the advantage of application program-level I/O over conventional calls to I/O through OS kernel services. It also illustrates the relationship of normal I2O services to application program-level I2O services.

In a typical I2O scenario, application program 100 makes procedure calls to kernel services software 102 of the OS kernel 104 to request I/O transactions. In response, kernel services 102 makes procedure calls to operating system (OS) driver software 106 and kernel OS service modules (OSMs) 108. In the I2O architecture, an OSM is a driver module that interfaces the host OS to the I2O message layer. In the split driver model of I2O, the OSM represents the portion of the driver that interfaces to host-specific application program interfaces (APIs), translating them to a neutral message-based format that goes to a hardware driver module for processing. The kernel OSMs 108 call the I2O message layer 110. The message layer provides the communication and queuing model between service modules. The messages are passed in an OS-neutral format. The I2O message layer 110 passes the messages to the VI architecture SAN transport layer 112 for transfer over a VI architecture system area network (SAN) 122 to an I/O platform 114 having one or more I/O devices 116. The transport layer is an abstraction of direct memory access (DMA) and access to I/O adapters.

In contrast, an embodiment of the present invention provides a direct path from the application program to the message and transport layers. A user level OSM 118 is provided in the application program 100 to send the I/O requests to the I/O platform 114. The user level OSM allows the application program to queue up messages for transmission on an established virtual connection. It is an OS-specific module for a particular I/O device that creates class-specific messages for the I/O device. The user level OSM makes procedure calls for user level services to user interface 120 within OS kernel 104. The user interface sets up the virtual connection using I2O message layer 110 and VI architecture SAN transport layer 112. The application program registers memory with the SAN and indicates the memory in the messages sent as I/O requests. A selected I/O device 116 is then able to perform a requested I/O operation to and from the specified memory in the application program. The I2O message layer 110 and VI architecture SAN transport layer 112, which are part of the OS kernel 104 on a host system, communicate via VI architecture SAN 122 with corresponding I2O SAN transport layer 124 and I2O message layer 126 on the I/O platform 114. Device driver modules 128 are at the lowest level in the I/O platform above the I/O devices 116. A DDM is a module that abstracts the service of an I/O device and registers it as an I2O device.

The present invention combines the memory registration of the VI architecture with the I2O messaging protocol thereby allowing the application program to register its virtual memory for use with the I/O subsystem. The process uses the virtual to physical mapping of the VI architecture to protect application program-level I/O requests from accessing or corrupting memory of other application programs while still making direct I/O requests to the I2O subsystem without OS kernel intervention. This significantly speeds up I/O operations while still maintaining OS integrity.

The OS kernel 104 controls I/O connection setup and thus limits the application program's ability to perform direct I/O to only those devices authorized by the OS. This is accomplished by the OS initializing a virtual interface to each I/O device. I2O provides a logical object for each I/O device. This object is an address that identifies the instance of the DDM 128 that controls the I/O device. The nature of the VI architecture limits message delivery to only the DDM and the DDM is required to use the virtual interface for accessing host memory. This limits the DDM to access only the memory which has properly been registered for it (i.e., the application program 100 has legally registered with appropriate authorization rights).

In typical prior art systems, the OS provided kernel services only for classes of I/O devices it understood. With the application program-level I/O of an embodiment of the present invention, the OS only makes the connection between the application program and the I/O device. All other I/O processing is done by entities other than the OS. The host portion of the I/O device driver (i.e., the user level OSM 118) resides in the application program as shown in FIG. 3. This means that the OS does not need to understand every class of I/O devices and that an appropriate OSM does not need to be installed in the OS. With application program-level I/O, new I/O technology can be incorporated into a computer system without requiring updates to the OS. It also allows I/O device vendors to provide new functions for computer systems that outpaces the ability for the OS to incorporate support for the new functions.

Figure 4:
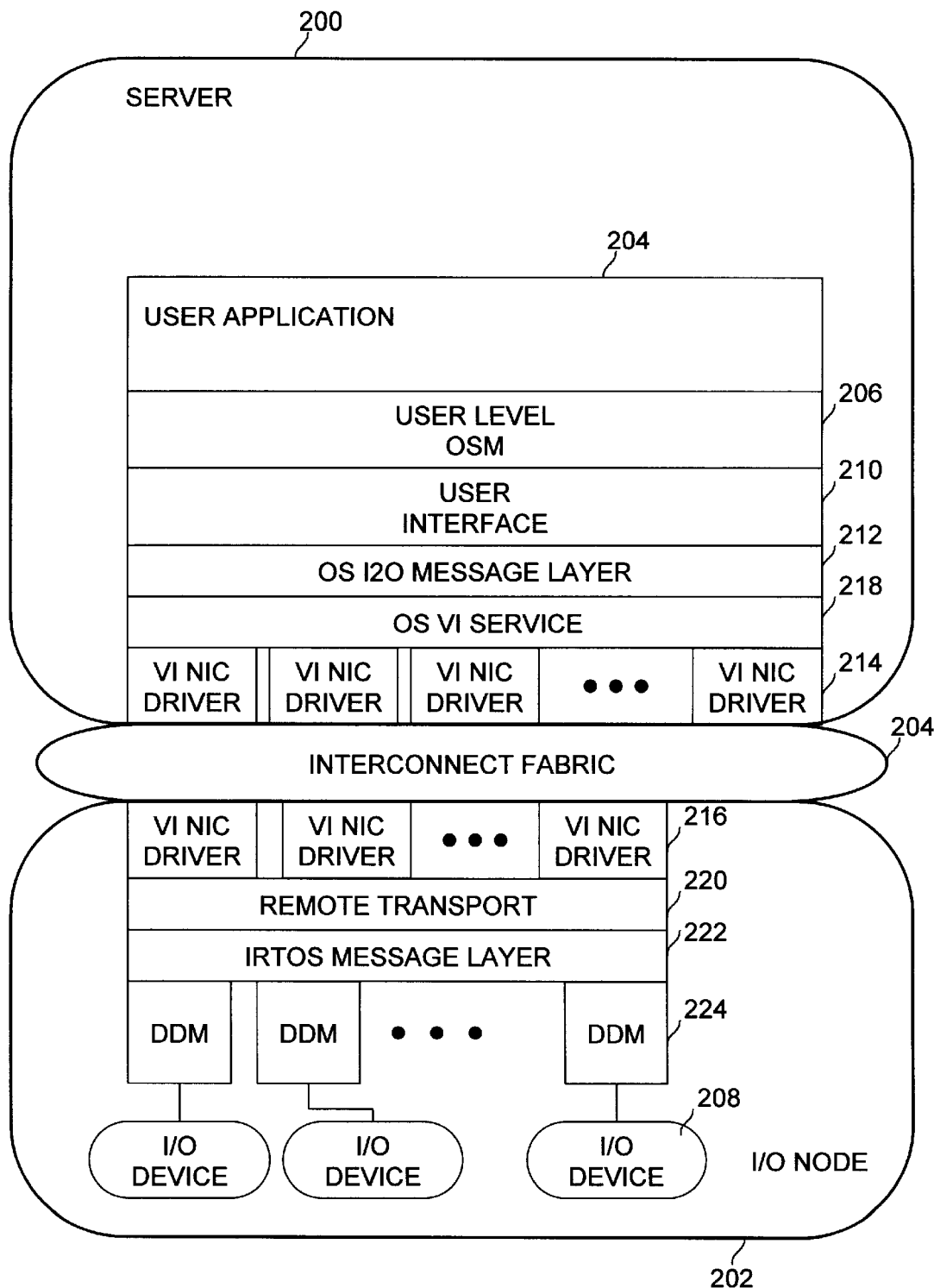
FIG. 4 is a diagram of the various layers of the I/O stack.

An embodiment of the present invention defines the process and interfaces necessary to provide application program-level I/O to any I/O device within a clustered set of servers. FIG. 4 is a diagram of the various layers of the I/O stack of the present invention. A server system 200 is coupled to an I/O node 202 by an interconnect fabric 204 according to the VI architecture. A user application 204 executing on the server requests user level OSM 206 to set up I/O processing with a selected I/O device 208 on I/O node 202. User level OSM 206 requests user interface 210 to transfer messages using OS I2O message layer 212 directly to the selected I/O device. User interface provides the definition for remote transport services. The OS I2O message layer provides the definition for remote message service and the interface to VI services. A plurality of VI network interface controller (NIC) drivers 214 resident on the server 200 communicate with a plurality of VI NIC drivers 216 resident on the I/O node 202 via the interconnect fabric 204. At least one OS VI service 218 controls access to the server-side VI NIC drivers for the requested I/O processing. On the I/O node 202, remote transport 220 interfaces with the VI NIC drivers 216, provides the definition for remote transport service, and provides the interface to real-time operating system (IRTOS) message layer 222. The IRTOS message layer defines the remote operation/behavior for the IRTOS with and without remote aware DDMs. It also defines an enhanced application program interface (API) for remote transport services. Finally, a plurality of DDMs 224 couple the I/O devices 208 with the IRTOS message layer 222.

Figure 5:
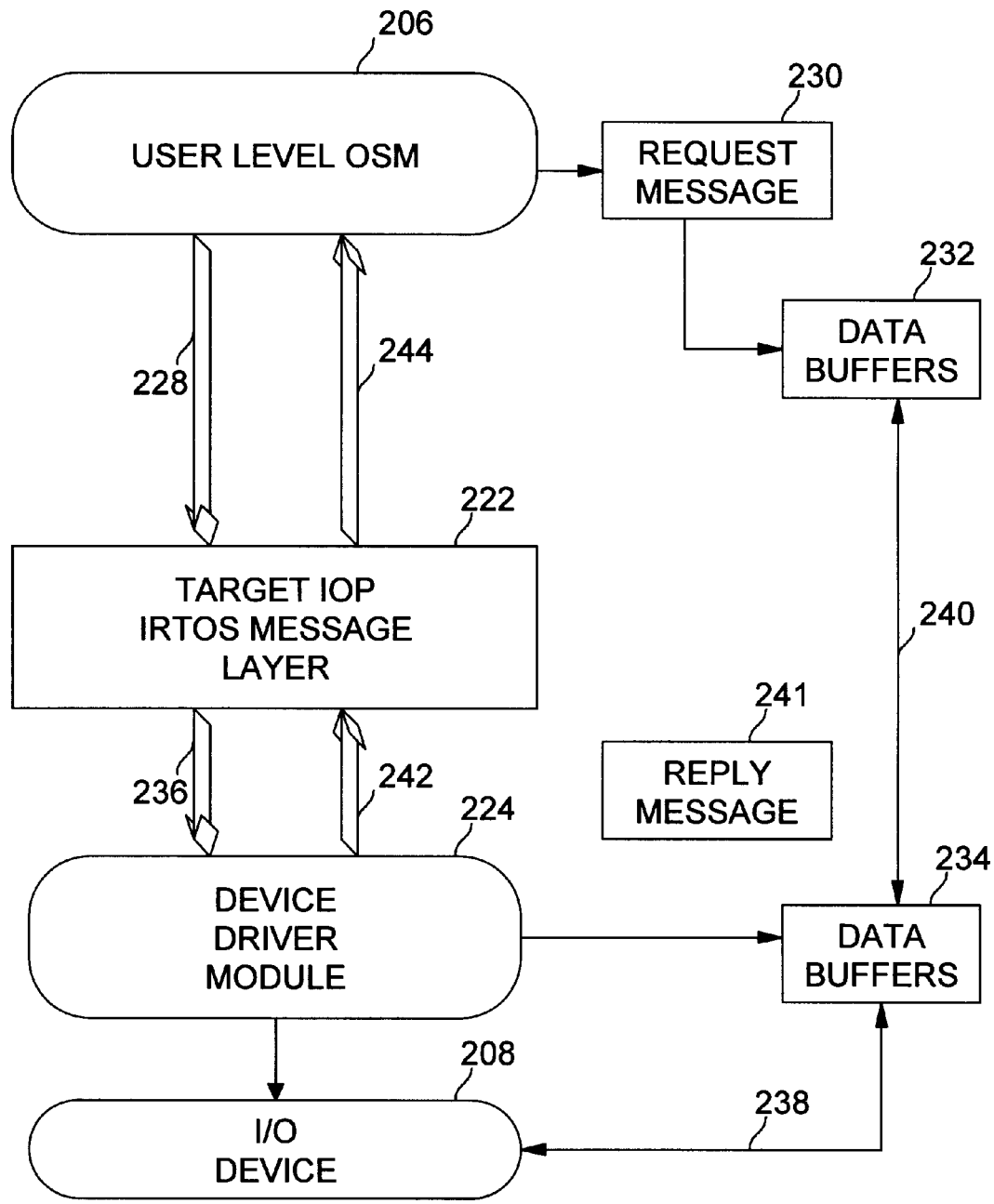
FIG. 5 is a diagram showing the operation of application program-level I/O.

FIG. 5 is a diagram showing the operation of application program-level I/O. For an I/O read operation, user level OSM 206 within an application program sends (arrow 228) a request message 230 specifying the application program's data buffers 232 on a designated virtual interface (VI) to a target I/O platform's (IOPs) IRTOS message layer 222. Next, the IRTOS message layer posts the request message (arrow 236) to the DDM 224 for the selected I/O device 208. The target DDM 224 allocates data buffers 234 on the IOP, and configures the I/O device 208 to read I/O data and store the I/O data into data buffers 234. The I/O device moves the I/O data (arrow 238) into the data buffers as the data is received. Next, the DDM transfers the I/O data (arrow 240) from data buffers 234 on the IOP over the designated VI to data buffers 232 in the application program's memory space on the server. A reply message is then sent (arrow 242) by the DDM to the target IOP IRTOS message layer 222. The IRTOS message layer sends the reply message (arrow 244) to the user level OSM 206 over the VI. Finally, the user level OSM accesses the I/O data in data buffers 232, concludes the transaction and releases the data buffers.

For an I/O write operation, a user level OSM 206 within an application program sends (arrow 228) a request message 230 specifying the application program's data buffers 232 on a designated VI to a target I/O platform's (IOPs) IRTOS message layer 222. Next, the IRTOS message layer posts the request message (arrow 236) to the DDM 224 for the selected I/O device 208. The target DDM 224 allocates data buffers 234 on the IOP, and configures the I/O device 208 to write I/O data from data buffers 234. The DDM transfers the I/O data (arrow 240) from data buffers 232 on the server over the designated VI to data buffers 234 on the IOP. The I/O device then moves the I/O data (arrow 238) from the data buffers 234 out to an external device (not shown). A reply message 241 is sent (arrow 242) by the DDM to the target IOP IRTOS message layer 222. The IRTOS message layer sends the reply message (arrow 244) to the user level OSM 206 over the VI. Finally, the user level OSM releases the data buffers and concludes the transaction.

Figure 6:
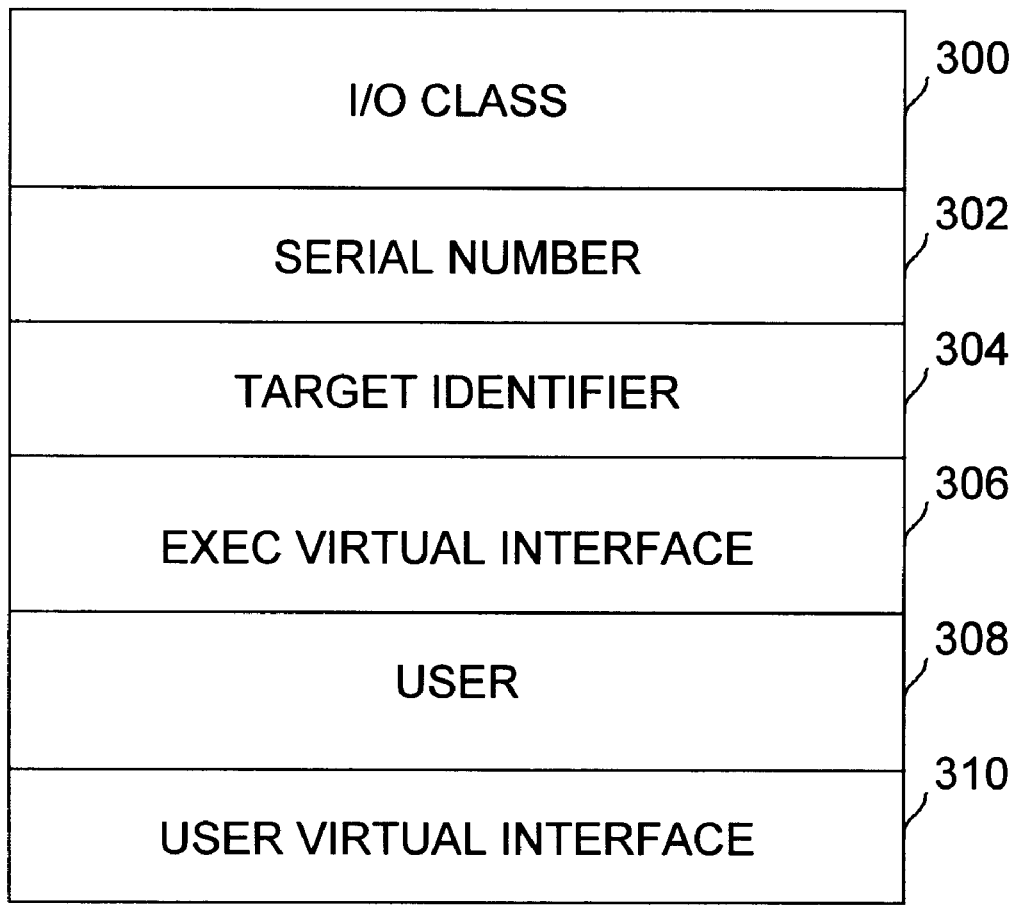
FIG. 6 is a diagram of an object for an I/O device.

In one embodiment, the OS maintains a table of available I/O devices on each I/O platform (IOP) and identifies each device by an object identifier. Each object identifier is a pointer or index to a data structure called an object, which holds information about the I/O device. FIG. 6 is a diagram of an object for an I/O device. The I/O class field 300 identifies the class of I/O device such as hard disk, floppy drive, tape drive, local area network (LAN), etc. The serial number field 302 identifies the specific instance of an I/O device. The target identifier field 304 identifies the specific instance of the I/O device driver. The exec virtual interface field 306 identifies the virtual interface on which the OS communicates with the IOP. The user field 308 identifies the application program (i.e., user) to which the I/O device is assigned. The user virtual interface field 310 identifies the virtual interface on which the application program communicates with the I/O device driver.

Figure 7:
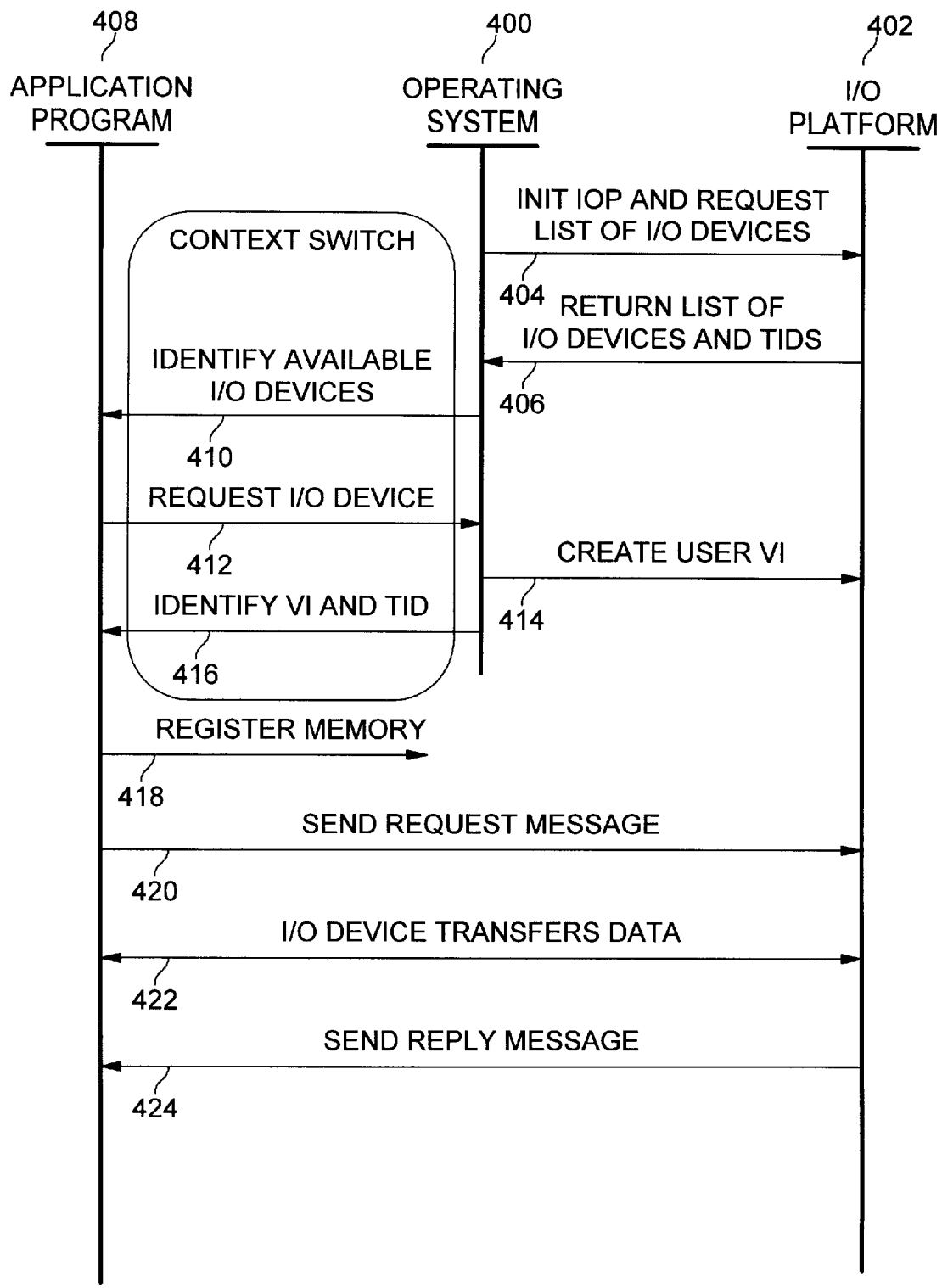
FIG. 7 is a diagram of the steps for establishing and using a virtual interface.

FIG. 7 is a diagram of the steps for establishing and using a virtual interface. For each IOP in the system, the OS creates a virtual interface (VI) to manage the IOP (i.e., an exec virtual interface). First, the OS 400 initializes each IOP (only one of which is shown in FIG. 7 as IOP 402) and requests a list of the IOP's I/O devices. This action is represented as flow 404. The IOP 402 provides the OS 400 with a list of I/O devices identifying the target identifier (TID), class and serial number of each I/O device (flow 406). The OS makes the list of I/O devices for each IOP available to users such as application program 408 (flow 410). The list includes entries having object identifier, I/O class, and serial number components. Each interaction between the OS and the application program entails a context switch as shown in FIG. 7. An application program 408 then requests the use of a specific I/O device (flow 412) by identifying the object identifier. The OS verifies that the I/O device is not already assigned. Using the exec virtual interface, the OS creates and sets up a private user virtual interface to the IOP for the application program 408 (flow 414). The OS identifies the new user virtual interface and target identifier of the I/O device driver (not shown) to the application program (flow 416). The direct connection between the application program and the IOP is now in place. The application program then registers memory with the SAN transport (not shown) that it will use for I/O transactions (flow 418). Next, the application program sends request messages to the I/O device driver (within the IOP 402) using the user virtual interface (flow 420). Each request message provides the target identifier of the I/O device driver and specifies the registered memory of the application program for the I/O transaction. The I/O device driver transfers data to/from the registered memory using the user virtual interface (flow 422). Finally, the I/O device driver sends a reply message directly to the application program using the user virtual interface (flow 424).

An embodiment of the present invention has been shown to move I/O data directly between buffers residing as part of an application program and an I/O platform without OS intervention. Messages are created in user space and transferred to an I/O device. In response, the I/O device transfers data between data buffers local to the application program and data buffers local to the I/O device.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of controlling I/O operations of an I/O device by an application program comprising:
   creating a virtual connection within a system area network between the application program and the I/O device, the application program and the I/O device being coupled to the system area network;
   registering the application program's memory with the system area network;
   sending, by the application program, a request message for I/O service directly to the I/O device over the virtual connection, the request message including a virtual address of the application program's memory; and
   transferring I/O data between the I/O device and the application program's memory specified by the virtual address over the virtual connection.

2. The method of claim 1, further comprising sending, by the I/O device, a reply message to the application program over the virtual connection after the transferring step.

3. The method of claim 1, wherein registering the application program's memory with the system area network comprises providing access rights to the I/O device thereby allowing the I/O device to access the application program's memory.

4. The method of claim 1, wherein the transferring step comprises transferring I/O data received by the I/O device to the application program's memory when an I/O read operation is specified in the request message.

5. The method of claim 1, wherein the transferring step comprises transferring I/O data from the application program's memory to the I/O device when an I/O write operation is specified in the request message.

6. The method of claim 1, wherein the application program is executed by a system having an operating system and the creating step comprises creating a connection between a network interface controller coupled to the system area network and a process of the application program, the connection not requiring performance of kernel services by the operating system.

7. The method of claim 1, wherein the request message further comprises a memory handle for protected access of the application program's memory.

8. A system for controlling I/O operations of an I/O device by an application program comprising:
   a system area network providing communications between the application program and the I/O device;
   means for creating a virtual connection within the system area network between the application program and the I/O device;
   means for registering the application program's memory with the system area network;
   means for sending, by the application program, a request message for I/O service directly to the I/O device over the virtual connection, the request message including a virtual address of the application program's memory; and
   means for transferring I/O data between the I/O device and the application program's memory specified by the virtual address over the virtual connection.

9. The system of claim 8, further comprising means for sending, by the I/O device, a reply message to the application program over the virtual connection.

10. The system of claim 8, wherein the registering means comprises means for providing access rights to the I/O device thereby allowing the I/O device to access the application program's memory.

11. The system of claim 8, wherein the application program is executed by a computer system having an operating system and the creating means comprises means for creating a connection between a network interface controller coupled to the system area network and a process of the application program, the connection not requiring performance of kernel services by the operating system.

12. The system of claim 8, wherein the request message further comprises a memory handle for protected access of the application program's memory.

13. An apparatus for controlling I/O operations of an I/O device by an application program comprising:
   a system area network providing communications between the application program and the I/O device, the system area network comprising a virtual connection within the system area network between the application program and the I/O device;
   an operating system module resident in the application program to register the application program's memory with the system area network and to send a request message for I/O service directly to the I/O device over the virtual connection, the request message including a virtual address of the application program's memory; and a device driver module coupled to the I/O device and the system area network to transfer I/O data between the I/O device and the application program's memory specified by the virtual address over the virtual connection.

14. The apparatus of claim 13, wherein the operating system module provides access rights to the I/O device thereby allowing the I/O device to access the application program's memory.

15. The apparatus of claim 13, wherein the application program is executed by a computer system having an operating system and further comprising a connection between a network interface controller coupled to the system area network and a process of the application program, the connection not requiring performance of kernel services by the operating system.

16. The apparatus of claim 13, wherein the request message further comprises a memory handle for accessing the application program's memory and an identifier of a process of the application program that registered the memory.

* * * * *